(12) United States Patent
Kenton et al.

(10) Patent No.: US 8,374,311 B2
(45) Date of Patent: Feb. 12, 2013

(54) SYSTEM AND METHOD FOR VERIFYING CORRECT ORDERING OF STACK OF COMPONENTS

(76) Inventors: Marc Kenton, Hanover, NH (US); John Wilson, Lebanon, NH (US); Matthew Miller, Hanover, NH (US); Christopher Eaton, Vershire, VT (US); Nabil Elkouh, Enfield, NH (US)

( * ) Notice: Subject to any disclaimer, the term of this patent is extended or adjusted under 35 U.S.C. 154(b) by 491 days.

(21) Appl. No.: 12/755,177

(22) Filed: Apr. 6, 2010

(65) Prior Publication Data

US 2012/0181449 A1    Jul. 19, 2012

Related U.S. Application Data

(60) Provisional application No. 61/167,049, filed on Apr. 6, 2009.

(51) Int. Cl.
*G01N 23/04* (2006.01)

(52) U.S. Cl. ........................................... 378/57

(58) Field of Classification Search .................... 378/57, 378/64, 207, 210
See application file for complete search history.

(56) References Cited

U.S. PATENT DOCUMENTS

2002/0107140 A1   8/2002   Hampden-Smith et al.
2007/0180687 A1   8/2007   Dixon et al.

FOREIGN PATENT DOCUMENTS

WO   2008004161 A2   1/2008

OTHER PUBLICATIONS

International Search Report and Written Opinion, International Application No. PCT/US2010/030080, mailed Jul. 19, 2010, 12 pages.

*Primary Examiner* — Courtney Thomas
(74) *Attorney, Agent, or Firm* — Oliff & Berridge, PLC (57) ABSTRACT

A method of determining whether a stack of components in a device are in a desired order includes irradiating each of the components in the device with an energy beam. The radiation emissions from each of the irradiated components are detected with a radiation detector. The detected radiation emissions are analyzed using a central processing unit (CPU) to determine whether the components in the device are stacked in the desired order.

22 Claims, 4 Drawing Sheets

SYSTEM AND METHOD FOR VERIFYING CORRECT ORDERING OF STACK OF COMPONENTS

CROSS REFERENCE TO RELATED APPLICATION

This application claims priority to U.S. Provisional Application No. 61/167,049, filed Apr. 6, 2009, the entirety of which is hereby incorporated by reference.

STATEMENT REGARDING FEDERALLY SPONSORED RESEARCH & DEVELOPMENT

Development of this invention was supported in part by Government support under contract no. W15QKN-08-D-0419 awarded by U.S. Army ARDEC. Accordingly, the United States Government may have certain rights in this invention.

BACKGROUND

The present invention generally relates to inspection of thermal batteries, more particularly, to systems, methods, and devices for determining whether a stack of pellets in a thermal battery are in a desired order.

Thermal batteries provide a large amount of energy relative to their volume. These batteries, if hermetically sealed, can be stored indefinitely without degradation of performance and can perform without preliminary preparation in many different environments. Thus, thermal batteries are a desirable source of power in a number of different applications. For example, thermal batteries are used in missile systems such as, JDAM, Stinger, Javelin, as well as other systems such as Aircraft Ejector Seats, and Sonar Buoys.

A typical thermal battery comprises one or more sections, with each section comprising one or more cells, and wherein each cell comprises a plurality of pellets. The pellets may, for example, be thin wafers of compacted powders forming the various components of the thermal battery. For example, the pellets may comprise an electrode, an anode, an electrolyte, a cathode, a pyrotechnic heat source, and/or the like. Thus, thermal batteries contain materials that are generally inert and non-conductive until the battery is activated.

Upon activation, the material becomes molten and highly conductive. This allows the cathode to interact with the anode. The thermal battery materials are activated by igniting the battery. For example, a mixture of iron powder and potassium perchlorate (the pyrotechnic heat source pellet) may be used to ignite a battery. Once activated, the battery may continue to perform until the active material is exhausted or until the battery cools below the melting point of the electrolyte.

Proper assembly of the thermal battery pellet stack insures proper function, specifically proper power output when the thermal battery is activated. Understandably, it is desirable to test thermal batteries in a manner that does not ignite the battery. One nondestructive thermal battery inspection test includes a test to verify that the components of the thermal battery are hermetically sealed. Other tests exist to verify the soundness of electrical connections within the thermal battery. For example, methods have been developed to test the soundness of electrical connections such as by use of insulation resistance, impedance, or capacitance tests. In another example, X-ray techniques have been used to create visual images of welds and to determine if a welded electrical connection was formed properly.

It is also important to test that the pellets are stacked in the correct order. In the past, efforts to test whether or not the pellets are stacked in the correct order have been visual in nature. In one such test, an operator visually confirms that the pellets are stacked in the correct order. This approach has associated drawbacks because the pellets are very thin and similar in appearance. Thus, from the side of the stack of pellets, it can be difficult to distinguish the pellets visually and determine if they are stacked in the proper order.

Some efforts have been made to automate this visual inspection through use of high resolution cameras and optical recognition techniques. Nevertheless, the same difficulties have been experienced in these automated visual inspection methods as in the human visual inspection methods. Thus, improved methods are needed for verifying that multiple components in a manufactured item were assembled in the proper order. In particular, improved methods are desired for verifying proper ordering in the pellet stack of a thermal battery.

SUMMARY

In one aspect, a method of determining whether a stack of pellets in a thermal battery are in a desired order, where the stack of pellets including at least one first type of pellet and at least one second type of pellet, generally comprises irradiating the first type of pellet in the thermal battery with an incident energy beam. The first type of pellet emits radiation in response to being irradiated with the energy beam. The radiation emissions from the irradiated first type of pellet are detected with a radiation detector. The second type of pellet in the thermal battery is irradiated with an incident energy beam. The second type of pellet emits radiation in response to being irradiated with the energy beam. The radiation emissions from the irradiated second type of pellet are detected with a radiation detector. The detected radiation emissions from the first type of pellet and the second type of pellet are analyzed to determine whether the first and second types of pellets in the thermal battery are stacked in the desired order.

In another aspect, a system for determining whether a stack of a plurality of different types of pellets of a thermal battery is in a desired order generally comprises a source of energy adapted to produce an energy beam and irradiate each of the pellets in the thermal battery. A radiation detector is configured to detect radiation emitted from each of the pellets in the thermal battery as each of the pellets is irradiated with the energy beam. An analyzing system includes a central processing unit (CPU) configured to analyze the detected radiation emissions to determine whether the pellets in the thermal battery are stacked in the desired order.

In yet another aspect, a method of determining whether a stack of components in a device are in a desired order generally comprises irradiating each of the components in the device with an energy beam. The components emit radiation in response to being irradiated. The radiation emissions from each of the irradiated components are detected with a radiation detector. The detected radiation emissions using a central processing unit (CPU) are analyzed to determine whether the components in the device are stacked in the desired order.

DETAILED DESCRIPTION OF THE DRAWINGS

Figure 1:
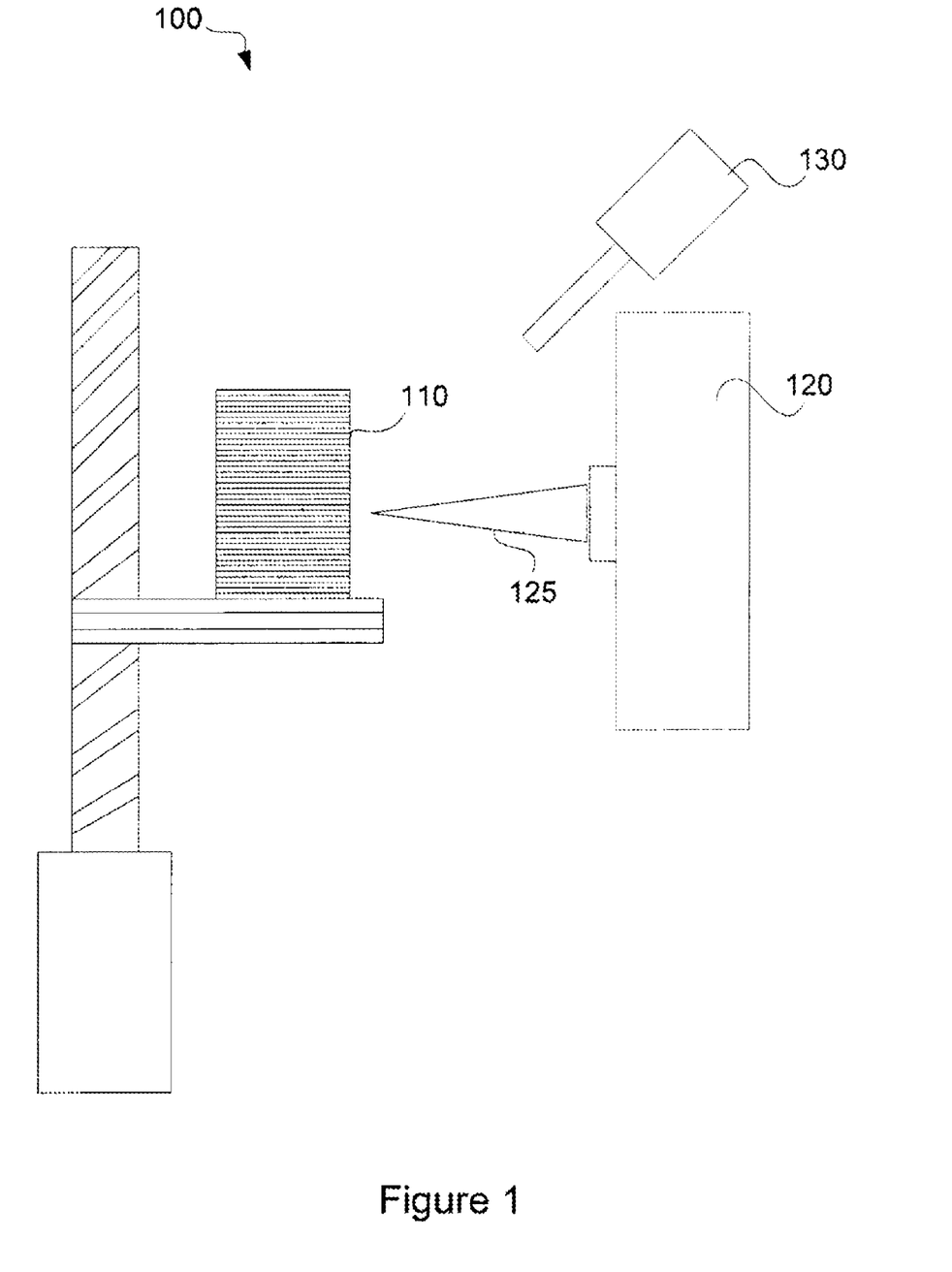
FIG. 1 illustrates an exemplary thermal battery testing system in accordance with an exemplary embodiment.

Referring to FIG. 1, and in accordance with an exemplary embodiment, a stack assembly order verification system 100 for verifying a stacked assembly 110 generally comprises an energy beam source 120 (e.g., x-ray source, electron source), a radiation detector or spectrometer 130, and a computer 310 in communication with the spectrometer. In general, the stack assembly order verification system 100 may be used to verify that components of the stack assembly are in the correct or desired order. The energy beam source 120 individually irradiates each of the components of the stack assembly 110, which causes radiation to be emitted from the components. The emitted radiation is detected by the spectrometer, which communicates the detected radiation to the computer 310 (i.e., a central processing unit of the computer). The computer 310 creates an x-ray spectrum representative of each component in the stack assembly 110. Thereafter the computer 310 may compare the energy spectra to a known energy spectrum of each pellet to determine whether the irradiated stack assembly is properly ordered.

In the illustrated embodiment, the stack assembly order verification system 100 is suitable for use in verifying the order of stacked pellets of a thermal battery. Thermal batteries exist in many sizes and shapes, have various performance factors, and are constructed of a variety of materials. Nevertheless, an exemplary thermal battery is described briefly herein. An exemplary thermal battery comprises one or more sections, with each section comprising one or more cells, and wherein each cell comprises a plurality of pellets. The pellets may, for example, be thin wafers of compacted powders forming the various components of the thermal battery. For example, the pellets may comprise an electrode, an anode, an electrolyte, a cathode, a pyrotechnic heat source, and/or the like. In various embodiments, pellets of various thicknesses, densities, and compositions may be used in the thermal battery.

In an exemplary embodiment, the pellets may have a thickness of three to five thousandths of an inch. In other exemplary embodiments, the pellets may have a thickness of three to ten thousandths of an inch. As mentioned above, it is this thinness of the pellets that makes visual techniques less useful. However, the techniques described herein may be suitable for any thickness of a pellet in an assembly of pellets. In another exemplary embodiment, the thickness of the pellet may be the same from pellet to pellet. More generally, in an exemplary embodiment, the thickness of the component may be the same from component to component. In other exemplary embodiments, the thickness of the pellets may vary from pellet to pellet.

Each pellet may comprise any suitable pellet density. In some embodiments, the densities of the pellets may be the same for similar pellets, while in other exemplary embodiments the densities of the pellets may vary from pellet to pellet. Moreover, in an exemplary embodiment the pellets may comprise thin wafer like structures formed from pressed powders. For example, the pellets may comprise a lithium alloy anode, an electrolyte, an iron disulfide cathode, a pyrotechnic heat source, and/or the like. In an exemplary embodiment, the pyrotechnic heat source may comprise a mixture of iron powder and potassium perchlorate. In addition, the pellets may comprise a stainless steel electrode. Other suitable materials may be used in addition to or in place of these exemplary materials. An exemplary thermal battery may further be configured with electrically conducting tabs between sections of the battery. There may be two or more tabs, and each tab may be electrically connected to a terminal on the thermal battery. Often, a thermal battery is packaged in a stainless steel container. The thermal battery may be used, for example, by electrically connecting to two or more of the thermal battery terminals and igniting the battery or by mechanically firing a primer.

The above described thermal battery is just one exemplary thermal battery device, and many variations, sizes, and configurations of thermal batteries exist. However, regardless of the configuration of the internal components, or the size and shape of the thermal battery, it is nevertheless desirable to test a thermal battery. Particularly, it is desirable to validate the order of the stack pellets to verify proper assembly of the thermal battery pellet stack to ensure proper function, as discussed above. Given the various geometries of thermal battery pellets, particularly the thin cross-sections of the pellets, an automated, non-visual inspection process is desirable.

Although described herein in the context of pellets in thermal batteries, it should be understood that the techniques described herein may work in other contexts and that the description herein related to pellets in a thermal battery may be similarly applicable to any component in an assembly of components, wherein the components are not all of the same material. In this exemplary, more general embodiment, an assembly of components may comprise more than one component and at least one of the two or more components is different from another component. The components may be different from each other because they are each made of different materials. In another exemplary embodiment, the components may be different from each other because they have different densities, or because they have any other different property that would be detectable by the system described herein. Thus, in general the testing may facilitate a determination of whether assembled components in an assembly have been assembled in the proper order.

Referring back to FIG. 1, the stacked assembly 110 may comprise a stack of thermal battery pellets as described above. In other exemplary embodiments, the stack of thermal battery pellets is further wrapped or enclosed in such a way that the pellets are not visible. In various embodiments, the stacked assembly 110 may be a thermal battery pellet stack or similar assembly where the order of the stacked assembly is critical to proper function.

In one embodiment, the energy beam source 120 is an x-ray source capable of irradiating the profile of a component of stacked assembly 110, such as, the thermal battery pellet. Given the geometry of the thermal battery pellet and the nature of the battery stack assembly, the x-ray source 120 may further comprise a focusing mechanism 125, such as collimator, a focusing optic, and/or the like. In various embodiments, the focusing mechanism 125 may be coupled to the x-ray source (or other energy beam source) to provide increased x-ray flux (broadly, energy flux) over a focal area, such as, a spot size of approximately 50 microns in width or diameter. Using a highly focused x-ray flux provides effective irradiation of the subject thermal battery pellet or pellets over their available cross section to accurately characterize the material composition of each individual thermal battery pellet even when these are very thin. In other embodiments, the focal area may be larger than about 50 microns in width or diameter. For example, the focal area may have a width or diameter greater than the pellet being analyzed but less than combined widths of the pellet being analyzed and an adjacent pellet. In such an example, the focal area may extend beyond the single pellet of interest being analyzed even if the focal area is centered on the pellet of interest. For example, the focal area may have a width of about 80 microns. As discussed below, the system may include software for filtering out signals that are not from the single pellet of interest.

In various embodiments, the x-ray source 120 (or energy beam source) may further comprise a collimator. The collimator may comprise a small slot, such as an 80 by 700 micron slot, in a lead disk capable of being coupled to a conventional x-ray tube. The size of the slot provides for a limited beam of x-rays to be emitted from the x-ray source enabling irradiation of assemblies with thin geometries, such as thermal battery pellets.

Selection of an appropriate x-ray source 120 device (or other energy source device) will depend on many factors including, but not limited to, the type of anode in the x-ray source 120 and the atomic number of the elements making up the substance to be irradiated. In an exemplary thermal battery embodiment, the pellets comprise materials with a relatively low-atomic number. For example, silicon has a relatively low atomic number. In such exemplary embodiments, x-ray source 120 may comprise a proportionally low energy source. In one exemplary embodiment, the x-ray source comprises a chromium anode. A chromium anode may be more efficient for generating photons. In an exemplary embodiment, the x-ray source may comprise an "X-Beam Excitation System" commercially available from X-ray Optical Systems, Inc. located at 15 Tech Valley Drive, East Greenbush, N.Y., 12061. Other suitable types of x-ray source 120, now known or hereafter created, may also be used. In various exemplary embodiments, one or more x-ray sources may be used.

The spectrometer 130 is configured to collect energy spectrum data emitted by the stacked assembly 110 after it is irradiated by the energy beam source 120. In various embodiments, spectrometer 130 may be a silicon drift spectrometer or the like. Further, spectrometer 130 may be any device capable of measuring photons emitted from an irradiated substance. Spectrometer 130 may be capable of measuring photon emissions from irradiated substance made of elements with low atomic numbers.

Figure 2:
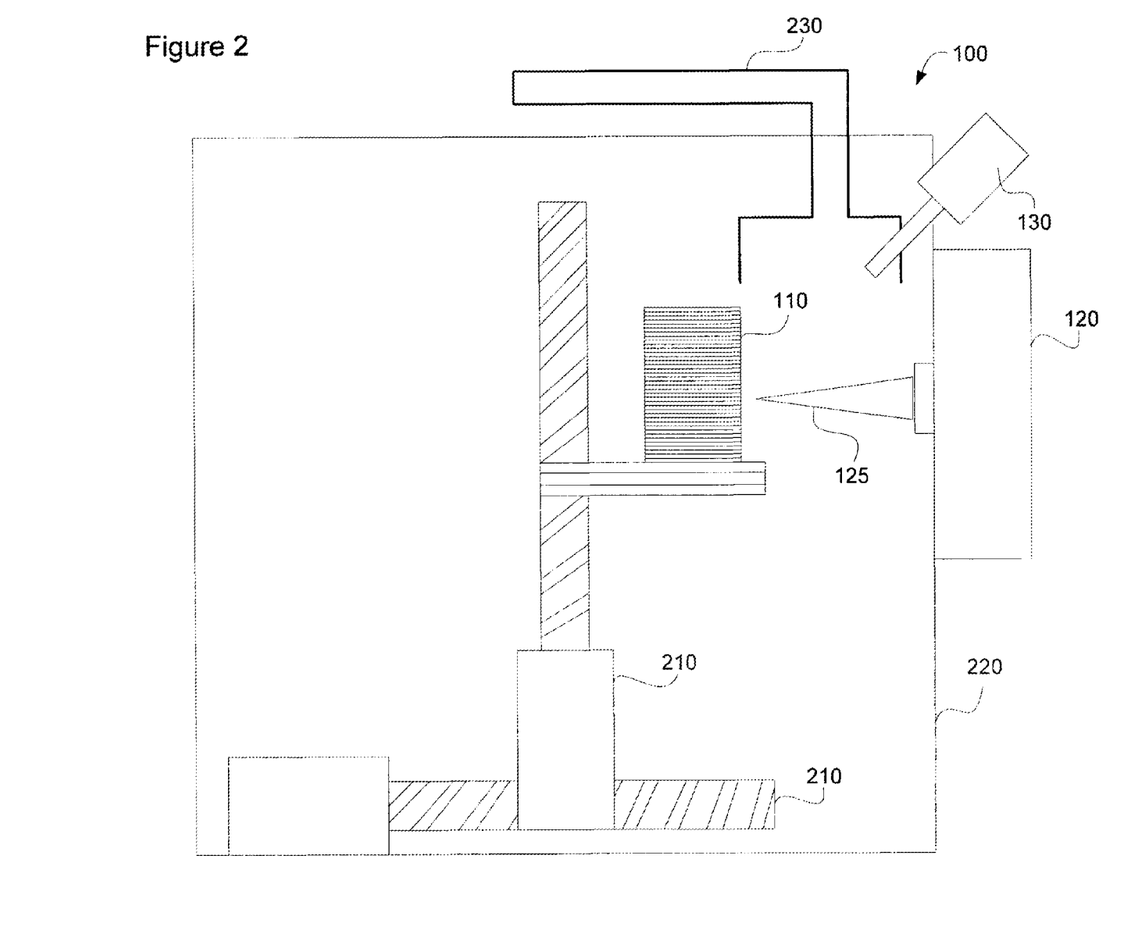
FIG. 2 illustrates an exemplary thermal battery testing system in accordance with another exemplary embodiment.

Referring to FIG. 2 and in accordance with various exemplary embodiments, the stack assembly order verification system 100 may further comprise a translation apparatus 210, a shielded housing 220, and/or a helium supply 230. The translation apparatus 210 may be operatively coupled to the stacked assembly 110. Further, the translation apparatus 210 may be configured to position the stacked assembly 110 at an appropriate location to be irradiated by the energy beam source 120 and monitored by spectrometer 130. The shielded housing 220 encloses the stacked assembly 110 and is operatively coupled to the energy beam source 120 and at least partially encloses the focusing mechanism 125. The shielded housing 220 may also be operatively coupled to the spectrometer 130 and to the helium source 230.

In various embodiments, the translation apparatus 210 is a structure configured to cause relative movement between the stacked assembly 110 and the energy beam source 120. For example, the translation apparatus 210 may be configured to hold the stacked assembly 110 and move the stacked assembly 110 relative to the energy beam source 120 in at least one direction, such as horizontal movement, vertical movement, and/or the like, to a requested location. In another exemplary embodiment, the translation apparatus 210 is configured to hold the energy beam source 120 and move the energy beam source 120 relative to the stacked assembly 110. In yet other exemplary embodiments, both the stacked assembly 110 and the energy beam source 120 may move. In various exemplary embodiments, the movement may be a continuous or a step wise movement.

The translation apparatus 210 may further comprise a sensor or sensors, motor(s), and computer aided controls to ensure proper position. The translation apparatus 210 may be configured as part of a multi-directional system that properly positions the stacked assembly 110 and/or the energy beam source (e.g., the x-ray source 120). In accordance with various exemplary embodiments, the translation apparatus 210 is configured to cause relative movement that focuses the energy beam at a single pellet. In an exemplary embodiment this relative movement is in the axial direction of the pellet stack. Thus movement in this direction moves from one pellet to the next. Moreover, in other exemplary embodiments, the relative movement may be in the radial direction of the pellet stack. Movement in this direction may aid in moving stacked assembly 110 further from or closer to energy beam source 120. Thus, the focal point can be located exactly on one pellet. In yet another embodiment, the translation apparatus 210 may be configured to rotate the stacked assembly 110 about its longitudinal axis. For example, the translation apparatus 210 may be configured to swivel the stacked assembly 110 about its longitudinal axis as the translation apparatus moves the stacked assembly axially. In this way, the energy beam irradiates a greater area of the pellet of interest than if the stacked assembly did not swivel. This embodiment may be particularly advantageous when powders in the pellets are not homogenously mixed. In accordance with various exemplary embodiments, the translation apparatus 210 further comprises a translation apparatus control system (not shown). The translation apparatus control system is configured to move the stacked assembly in one, two, or three directions to aid in focusing the energy beam on a single pellet.

In various embodiments, the shielded housing 220 is a structure that is at least partial lined with a radiation insulating material, such as an x-ray insulating material, to prevent unnecessary exposure to radiation, such as x-rays, emitted by the energy source 120. In an exemplary embodiment, the shielded housing 220 comprises a lead type material. Other suitable materials may be used. In accordance with an exemplary embodiment, the shielded housing 220 is further configured to enclose the stacked assembly 110 and is capable of retaining the energy beam source 120 and the spectrometer 130, wherein the stacked assembly 110 and/or the energy beam source 120 is moveable as discussed above.

Where the shielded housing comprises the helium supply 230, the helium gas may be pumped into the shielded housing 220, described above, to purge ambient air from the shielded housing environment. A helium environment is created to reduce the attenuation of the x-rays and/or other radiation emitted from the stacked assembly 110. Drawing a vacuum in the housing 220 may similarly be used.

Figure 3:
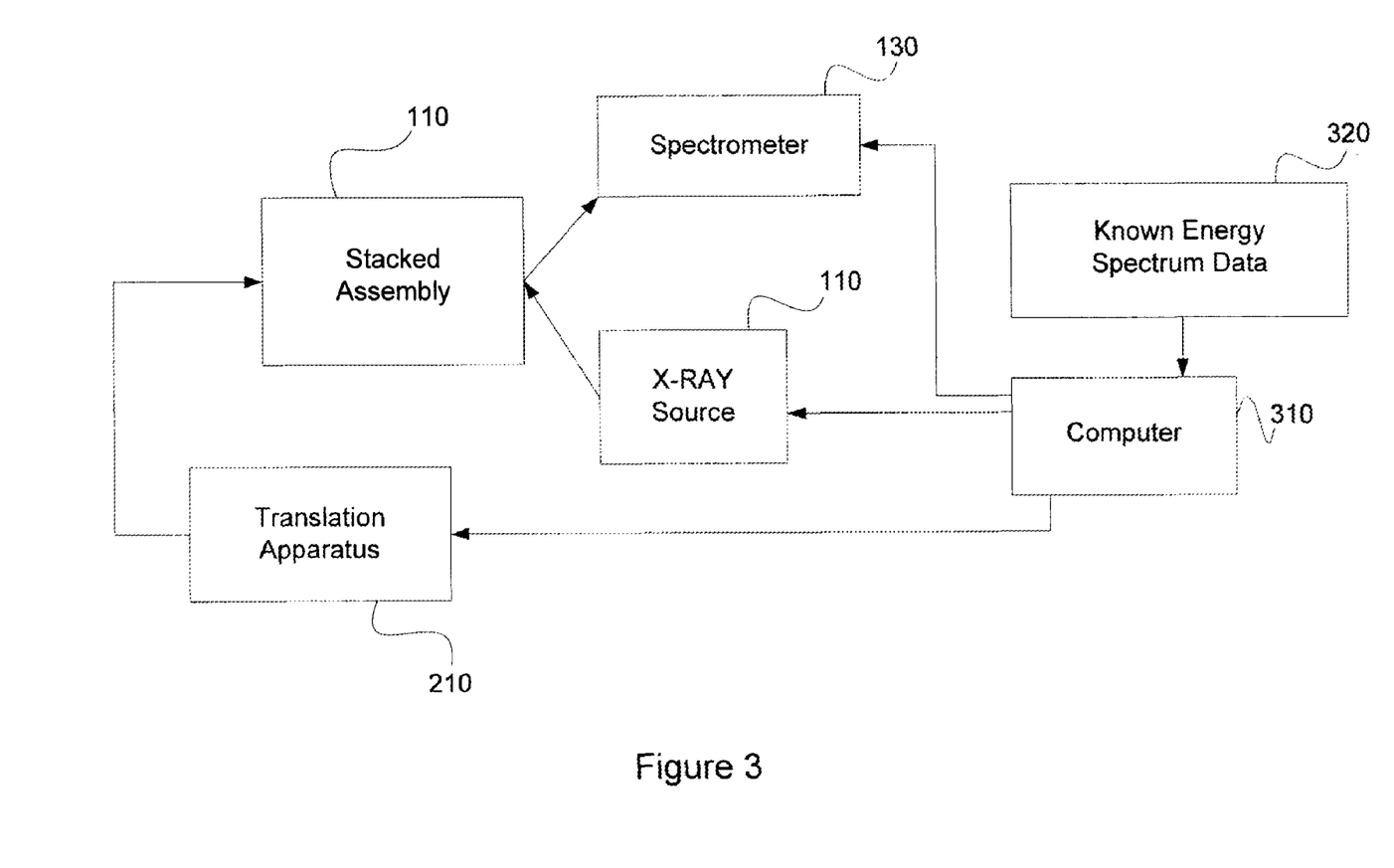
FIG. 3 is a block diagram illustrating an exemplary system and interaction between components of that system.

Referring now to FIG. 3 and in accordance with an exemplary embodiment, the spectrometer 130 is operatively coupled to an analyzer, such as the computer 310. Data measured by the spectrometer 130 may be provided to a central processing unit (CPU) of the computer 310 for analysis. The data may be provided via a suitable connector, wireless communication, manual data transfer via a machine readable medium, and/or the like. The computer 310 may also be operatively coupled to the translation apparatus 210 to provide computer aided control for movement of the stacked assembly 110 and/or the energy beam source 120.

In various embodiments the computer 310 may further comprise a memory device having known energy spectrum data 320. For example, the known energy spectrum data 320 may comprise cataloged energy spectra of known pellet materials, densities, and/or the like. In another exemplary embodiment, known energy spectrum data 320 may comprise cataloged energy spectrums of properly ordered stacked assemblies. Known energy spectrum data may be compared to energy spectrum readings measured by the spectrometer 130. The computer 310, more specifically the CPU, may further comprise software configured to analyze the measured energy spectrum readings. The software may be configured to determine whether the measured data conforms to the known energy spectrum data 320. The software may be configured to identify the various pellets in the stacked assembly 110. In various exemplary embodiments, the software 330 may also be configured indicate whether the stacked assembly 110 is ordered in accordance with a properly ordered stacked assembly.

Software may be configured to filter or remove noise from the spectrum being analyzed. In one example, the software may be configured to mathematically fit the peaks in the spectrum to a series of Gaussian distributions each of which is centered on the energy peak of the element that is of interest. This technique compensates for any background noise, which allows for more accurate results from a noisy spectrum. Moreover, this software may be used to automatically calibrate the spectrometer.

As discussed above, in the embodiment where the focal area of the x-ray flux extends beyond the pellet being analyzed to adjacent pellets, software may be configured to "filter" out signals (i.e., noise) from the adjacent pellets that are not of interest. In one example, the software determines the best match between a recorded x-ray spectrum (which can include peaks from an adjacent pellet) and that of a stored library of spectra previously obtained from the various pellets that comprise the battery. To improve the accuracy of this matching process, the strength of certain peaks that have particular value for distinguishing the various components is multiplied by a preselected factor. For example, in many cases the thinnest component of a thermal battery is made of stainless steel. The stainless steel contains nickel which is not found in most of the other components. By multiplying the height of the nickel peak of both the recorded spectrum and those of the component library by the same preselected factor before performing the matching procedure, the identity of the thin stainless steel component can be reliably determined even when peaks are present in the spectrum from adjacent, non-nickel containing components. More generally, by carefully selecting a set of such multiplying factors for the various peaks, the overall reliability of the identification process is substantially improved, overcoming possible limitations imposed by the width or diameter of the focal area of the source.

Figure 4:
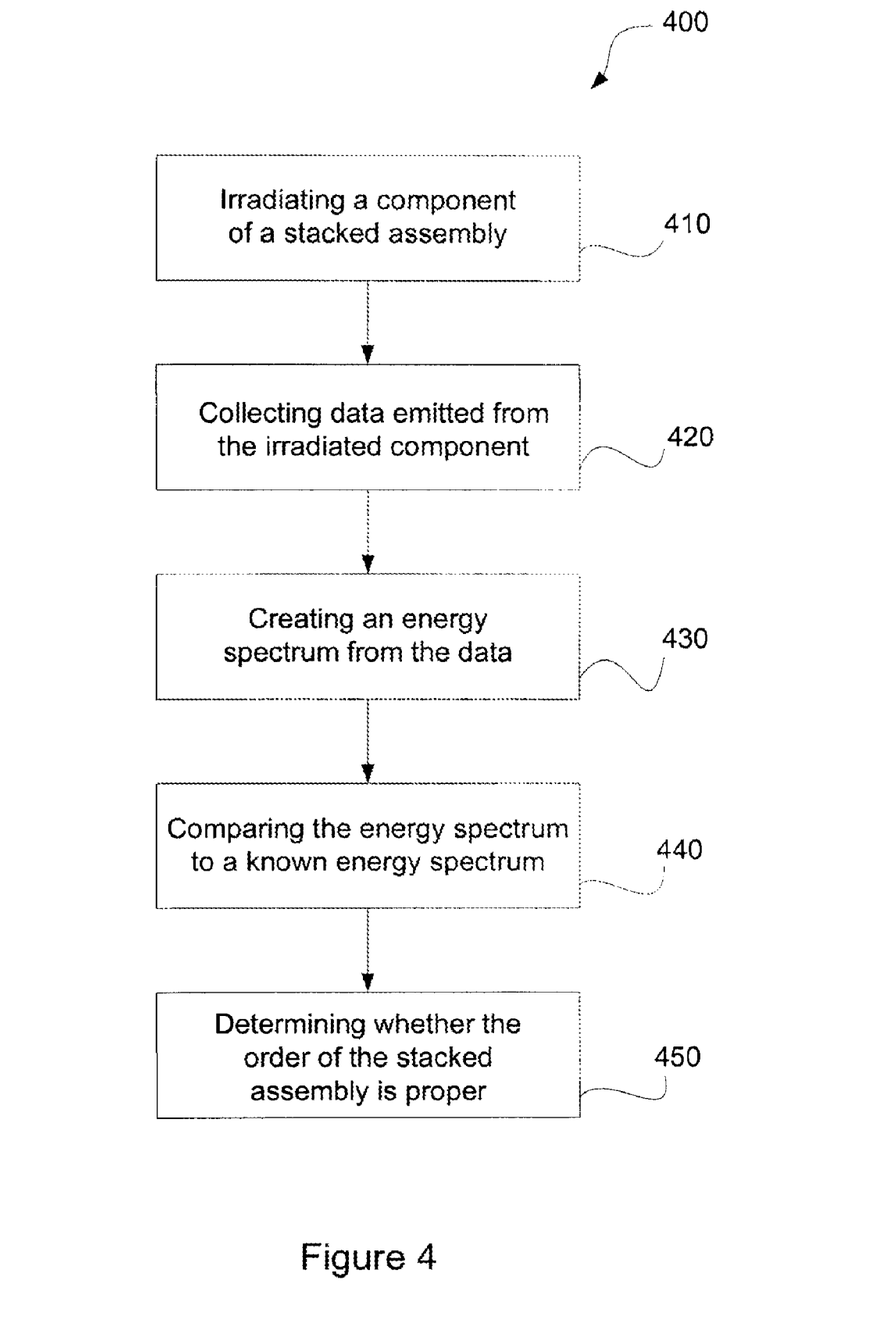
FIG. 4 is an exemplary method for verifying that the order of pellets in a thermal battery is correct.

Referring now to FIG. 4 and in accordance with an exemplary embodiment, a method 400 for verifying the order of a stacked assembly may comprise irradiating a component of the stacked assembly (step 410), detecting energy spectrometry data emitted from the irradiated component (step 420), creating an energy spectrum from the collected data (step 430), comparing the energy spectrum to a known energy spectrum (step 440), and determining whether the order of the stacked assembly is proper (step 450).

In accordance with a further exemplary embodiment, should a stacked assembly be determined to have an order error, the stack can be reworked. For example, the stack may be flagged and taken apart to fix the portion of the stack that is out of order. In this way, material may be saved and quality can be improved. Thus, more generally stated, exemplary systems disclosed herein may be configured to determine whether the thermal battery pellets (individually and/or collectively) satisfy standards and/or specifications for that type of thermal battery.

In accordance with various embodiments, various types of thermal batteries may be tested. A thermal battery may be tested in the factory, during the construction process and/or as a finished thermal battery.

The present invention may be described herein in terms of functional block components, optional selections and/or various processing steps. It should be appreciated that such functional blocks may be realized by any number of hardware and/or software components suitably configured to perform the specified functions. For example, the present invention may employ various integrated circuit components, e.g., memory elements, processing elements, logic elements, look-up tables, and/or the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, messaging, data processing, network control, and/or the like.

Further, the description of various embodiments herein makes reference to the accompanying drawing figures, which show the embodiments by way of illustration and not of limitation. While these embodiments are described in sufficient detail to enable those skilled in the art to practice the invention, it should be understood that other embodiments may be realized and that logical and mechanical changes may be made without departing from the spirit and scope of the invention. Thus, the disclosure herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections might be present in a practical thermal battery testing system.

Additionally, functional blocks of the block diagrams and flowchart illustrations provided herein support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based electronics and/or computer systems which perform the specified functions or steps, or suitable combinations of special purpose hardware and computer instructions.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the claims that may be included in an application that claims the benefit of the present application, in which reference to an element in the singular is not intended to mean "one and only one" unless explicitly so stated, but rather "one or more." Moreover, where a phrase similar to "at least one of A, B, and C" may be used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although certain embodiments may have been described as a method, it is contemplated that the method may be embodied as computer program instructions on a tangible computer-readable carrier and/or medium, such as a magnetic or optical memory or a magnetic or optical disk. All structural, chemical, and functional equivalents to the elements of the above-described embodiments that are known to those of ordinary skill in the art are contemplated within the scope of this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of determining whether a stack of pellets in a thermal battery are in a desired order, the stack of pellets including at least one first type of pellet and at least one second type of pellet, the method comprising:
    irradiating the first type of pellet in the thermal battery with an incident energy beam, wherein the first type of pellet emits radiation in response to being irradiated with the energy beam;
    detecting the radiation emissions from the irradiated first type of pellet with a radiation detector;
    irradiating the second type of pellet in the thermal battery with an incident energy beam, wherein the second type of pellet emits radiation in response to being irradiated with the energy beam;
    detecting the radiation emissions from the irradiated second type of pellet with a radiation detector;
    analyzing the detected radiation emissions from the first type of pellet and the second type of pellet to determine whether the first and second types of pellets in the thermal battery are stacked in the desired order.

2. The method set forth in claim 1 wherein the first type of pellet and the second type of pellet are individually and sequentially irradiated with an incident energy beam from a same energy beam source.

3. The method set forth in claim 1 wherein said analyzing the detected radiation emissions comprises analyzing the detected radiation emissions using a central processing unit (CPU).

4. The method set forth in claim 1 further comprising generating energy spectra representative of the first and second types of pellets contained in the thermal battery stack assembly using the respective detected radiation emissions, wherein said analyzing the detected radiation emissions comprises comparing said energy spectra to reference energy spectra representative of first and second types of pellets stacked in the desired order in a thermal battery.

5. The method set forth in claim 1 further comprising generating energy spectrum representative of each of the first and second types of pellets contained in the thermal battery stack assembly using the respective detected radiation emissions, wherein said analyzing the detected radiation emissions comprises identifying each of the irradiated first and second types of pellets by pellet type based on the energy spectrum and determining whether each of the identified pellet types is in a desired location in the thermal battery.

6. The method set forth in claim 2 further comprising at least one of moving the stack of pellets relative to the energy beam and moving the energy beam relative to the stack of pellets after irradiating the first type of pellet and before irradiating the second type of pellet.

7. The method set forth in claim 6 wherein said at least one of moving the stack of pellets relative to the energy beam and moving the energy beam relative to the stack of pellets comprises moving the stack of pellets relative to the energy beam at least along a longitudinal axis of the stack of pellets.

8. The method set forth in claim 7 wherein said at least one of moving the stack of pellets relative to the energy beam and moving the energy beam relative to the stack of pellets further comprises moving the stack of pellets relative to the energy beam in a transverse direction with respect to the longitudinal axis of the stack of pellets.

9. The method set forth in claim 1 wherein said irradiating the first type of pellet and said irradiating the second type of pellet each comprises focusing the energy beam to provide an increased energy flux over a focal area that is equal to or less than a combined exposed cross-sectional area of the first and second types of pellets.

10. The method set forth in claim 9 wherein said focusing the energy beam comprises focusing the energy beam to provide an increased energy flux over a focal area that has a width measuring about 50 µm.

11. The method set forth in claim 9 wherein said focusing the energy beam comprises collimating the energy beam using a collimator.

12. A system for determining whether a stack of a plurality of different types of pellets of a thermal battery is in a desired order comprising:
    a source of energy adapted to produce an energy beam irradiate each of the pellets in the thermal battery;
    a radiation detector configured to detect radiation emitted from each of the pellets in the thermal battery as each of the pellets is irradiated with the energy beam;
    an analyzing system including a central processing unit (CPU) configured to analyze the detected radiation emissions to determine whether the pellets in the thermal battery are stacked in the desired order.

13. The system set forth in claim 12 wherein the radiation detector is operatively connected to the analyzing system for communicating the detected emitted radiation to the analyzing system, the spectrometer being configured to create actual energy spectra representative of the pellets in the thermal battery and to output the actual energy spectra to the analyzing system.

14. The system set forth in claim 13 wherein the analyzing system includes a memory device, the memory device having stored reference data indicative of reference energy spectra of the pellets stacked in a correct order in a thermal battery, the CPU being configured to access the stored reference data and compare the actual energy spectra to the reference energy spectra to determine whether the stacked pellets are in the desired order.

15. The system set forth in claim 12 further comprising a translation apparatus configured to move at least one of the stack of pellets in the thermal battery relative to the source energy and the source of energy relative to the stack of pellets in the thermal battery.

16. The system set forth in claim 15 wherein the translation apparatus is configured to move the stack of pellets in the thermal battery relative to the source of energy along the longitudinal axis of the stack of pellets.

17. The system set forth in claim 16 wherein the translation apparatus is further configured to rotate the stack of pellets around the longitudinal axis of the stack of pellets.

18. The system set forth in claim 12 further comprising a focusing mechanism operatively coupled to the source of energy and adapted to provide increased energy flux over a focal area.

19. The system set forth in claim 12 further comprising a collimator operatively coupled to the source of energy to limit an area of the energy beam applied to each of the pellets.

20. The system set forth in claim 12 further comprising a shielded housing adapted to receive and enclose the stack of pellets therein and to inhibit radiation emitted from the pellets from exiting the shielded housing.

21. The system set forth in claim 12 wherein the source of energy comprises a chromium anode.

22. A method of determining whether a stack of components in a device are in a desired order, the method comprising:
   irradiating each of the components in the device with an energy beam, wherein the components emit radiation in response to being irradiated;
   detecting the radiation emissions from each of the irradiated components with a radiation detector;
   analyzing the detected radiation emissions using a central processing unit (CPU) to determine whether the components in the device are stacked in the desired order.

* * * * *